(12) United States Patent
Lasser et al.

(10) Patent No.: US 7,865,658 B2
(45) Date of Patent: Jan. 4, 2011

(54) METHOD AND SYSTEM FOR BALANCING HOST WRITE OPERATIONS AND CACHE FLUSHING

(75) Inventors: Menahem Lasser, Kohav-Yair (IL); Itshak Afriat, Tel-Mond (IL); Opher Lieber, Kfar Saba (IL); Mark Shlick, Ganey Tikva (IL)

(73) Assignee: SanDisk IL Ltd., Kfar Saba (IL)

( * ) Notice: Subject to any disclaimer, the term of this patent is extended or adjusted under 35 U.S.C. 154(b) by 444 days.

(21) Appl. No.: 11/967,369

(22) Filed: Dec. 31, 2007

(65) Prior Publication Data

US 2009/0172286 A1    Jul. 2, 2009

(51) Int. Cl.
  *G06F 12/00*  (2006.01)
  *G06F 13/00*  (2006.01)
(52) U.S. Cl. .................. 711/103; 711/113; 711/118
(58) Field of Classification Search .............. None
  See application file for complete search history.

(56) References Cited

U.S. PATENT DOCUMENTS

| | | | |
|---|---|---|---|
| 5,636,355 A | | 6/1997 | Ramakrishnan et al. |
| 5,883,904 A | * | 3/1999 | Arimilli et al. ............... 714/710 |
| 5,895,488 A | | 4/1999 | Loechel |
| 5,930,167 A | | 7/1999 | Lee et al. |
| 5,937,425 A | | 8/1999 | Ban |
| 6,412,045 B1 | | 6/2002 | DeKoning et al. |
| 6,678,785 B2 | | 1/2004 | Lasser |
| 6,976,128 B1 | | 12/2005 | Williams et al. |
| 7,076,605 B1 | | 7/2006 | Son |
| 2004/0073751 A1 | * | 4/2004 | Horrigan et al. ............ 711/135 |
| 2005/0055512 A1 | | 3/2005 | Kishi |
| 2005/0172082 A1 | | 8/2005 | Liu et al. |
| 2007/0061502 A1 | | 3/2007 | Lasser et al. |
| 2007/0118698 A1 | | 5/2007 | LaFrese et al. |
| 2007/0250660 A1 | | 10/2007 | Gill et al. |
| 2007/0283081 A1 | | 12/2007 | Lasser |
| 2009/0157974 A1 | | 6/2009 | Lasser |

OTHER PUBLICATIONS

International Search Report issued in application No. PCT/US2008/086247 on Jul. 27, 2009 (6 pages).
Written Opinion issued in application No. PCT/US2008/086247 on Jul. 27, 2009 (4 pages).
U.S. Appl. No. 11/876,893, filed Oct. 23, 2007.
Office Action issued in U.S. Appl. No. 11/954,946, dated Aug. 2, 2010, 14 pages.

* cited by examiner

*Primary Examiner*—Kevin Verbrugge
(74) *Attorney, Agent, or Firm*—Brinks Hofer Gilson & Lione

(57) ABSTRACT

A method and system for balancing host write operations and cache flushing is disclosed. The method may include steps of determining an available capacity in a cache storage portion of a self-caching storage device, determining a ratio of cache flushing steps to host write commands if the available capacity is below a desired threshold and interleaving cache flushing steps with host write commands to achieve the ratio. The cache flushing steps may be executed by maintaining a storage device busy status after executing a host write command and utilizing this additional time to copy a portion of the data from the cache storage into the main storage. The system may include a cache storage, a main storage and a controller configured to determine and execute a ratio of cache flushing steps to host write commands by executing cache flushing steps while maintaining a busy status after a host write command.

41 Claims, 4 Drawing Sheets

METHOD AND SYSTEM FOR BALANCING HOST WRITE OPERATIONS AND CACHE FLUSHING

BACKGROUND

Non-volatile memory systems, such as flash memory, have been widely adopted for use in consumer products. Flash memory may be found in different forms, for example in the form of a portable memory card that can be carried between host devices or as a solid state disk (SSD) embedded in a host device. Two general memory cell architectures found in flash memory include NOR and NAND. In a typical NOR architecture, memory cells are connected between adjacent bit line source and drain diffusions that extend in a column direction with control gates connected to word lines extending along rows of cells. A memory cell includes at least one storage element positioned over at least a portion of the cell channel region between the source and drain. A programmed level of charge on the storage elements thus controls an operating characteristic of the cells, which can then be read by applying appropriate voltages to the addressed memory cells.

A typical NAND architecture utilizes strings of more than two series-connected memory cells, such as 16 or 32, connected along with one or more select transistors between individual bit lines and a reference potential to form columns of cells. Word lines extend across cells within many of these columns. An individual cell within a column is read and verified during programming by causing the remaining cells in the string to be turned on so that the current flowing through a string is dependent upon the level of charge stored in the addressed cell.

Some flash memory management systems employ self-caching architectures where data received from a host is first stored in a portion of the flash memory designated as the cache and is later copied to a portion of the flash memory designated as a main storage area. In this type of flash memory management system, there is the question of when to schedule cache flushing operations. In cache flushing operations, a portion of the data in the cache, typically data corresponding to a common logical block, is copied from the cache to the main storage area and then removed from the cache to make room for new input data in the cache. As used herein, the terms cache flushing and cache clearing are synonymous.

Self-caching flash memory management systems may employ different policies regarding the scheduling of cache flushing operations and regarding the selection of the specific data to be flushed. Typically, the factors influencing the scheduling decisions are how full the cache is, and whether there are access requests arriving from the host that have to be serviced. When the storage system is idle with respect to host requests, the flash memory management system will typically flush all data in the cache so that the cache is better prepared for a possible future burst of host activity.

The write performance of a self-cached storage device is generally specified by two numbers. The first number is the burst write performance. Burst write performance is the rate at which the storage device can absorb an input stream of data when there is enough room in the cache. Accordingly, burst write performance depends solely on the write performance of the cache, not on the write performance of the main storage area. The second number is the sustained write performance. Sustained write performance is the rate at which the storage device can absorb streams of input data that are much larger than the cache size. The sustained write performance is a function of both cache write performance and main storage area write performance. If the main storage area is much slower than the cache, then the sustained write performance is determined mainly by the main storage area write performance.

Even though a storage device is specified for some given sustained input rate, there is nothing stopping a host from sending data into the storage device at a higher rate than specified and relying on the storage device to raise a "busy" condition to delay the input stream when it is not capable of keeping with the pace, and to clear the busy status when more input can be received. This is indeed how many real-life hosts operate. The host will send data to be written into the storage device as fast as it can, and continue to do so until the storage device forces it to hold off and wait.

When following this pattern of operation, the typical observed effect will be as follows. Assuming the cache of the storage device starts out empty, the host will first see a high performance equal to the burst write performance. Gradually, the cache will be filled up, but the performance will still be the burst performance up until the point where the cache is completely full or very close to it. At this point, the storage device must raise the busy status and start clearing space in the cache by moving some content to the main storage area. Typically, the busy status will clear only after data corresponding to a full logical block is copied from the cache. As a result, the host might encounter a relatively long busy period that can be a few tenths of a second or even a few seconds if the main storage is slow and the block is large. Although the average performance seen by the host may still be within the advertised sustained write performance rate specifications, some hosts might not be able to handle such long busy periods. This is because a long busy period requires a larger buffer in the host for accumulating all the new data that might be generated in a worst case situation during the busy period.

In some cache implementations the problem may be even worse because the effective rate of clearing data out of the cache might decrease as the cache becomes fuller. This might happen when the host writes data to random addresses, rather then sequentially, and where the cache uses flash memory organized in large blocks containing many data pages. In such devices not only are the busy periods longer, but the sustained write performance may not be met when the cache continuously operates near its fullest state.

In some cases, there are also hard limits on the time the storage device may indicate a busy status and violating such limit might cause the host to abort a transaction. For example, the SecureDigital (SD) standard for flash memory requires an SD-compliant card to always respond to a host write command within no more than 250 milliseconds. If a card does not meet this strict time limitation, a host might terminate the communication session with the card and abort the data storage operation. Thus, getting into an "always full cache" mode of operation can significantly increase the risk of violating such a time limit.

Cached storage devices generally use a policy for flushing data where data is flushed from a cache on one of two conditions. The first condition is when the storage device is idle, where a storage device is defined as idle when it is not receiving data from the host or otherwise being accessed by the host. The second condition is when there is no other way to receive new data as there is no more room in the cache. Such a cache flushing policy can result in the problems explained above. Some cached storage devices provide the host with explicit control on flash operations, however it is difficult for a host to utilize such control on the cache operation to avoid the above problems. For a host to do so requires detailed knowledge and understanding of the internals of the storage device, which is information that a generic host does not have.

SUMMARY

In order to address the problems noted above, a method and system for balancing host write operations and cache flushing is disclosed.

According to a first aspect of the invention, a method is disclosed for a managing movement of data from a cache storage to a main storage in a storage device in which incoming data received in write commands from an external host are first stored in the cache storage and later moved to the main storage. The method includes receiving a write command from the host at the storage device, storing data received with the write command in the cache storage and generating a busy status at the storage device after receiving the write command. The method further includes, subsequent to storing the data in the cache storage, copying at least a portion of data from the cache storage to the main storage while maintaining the busy status, where sufficient available capacity is present in the cache for receiving data in a subsequent write command from the host when the copying is initiated.

According to another aspect, a method of managing movement of data from a cache storage to a main storage in a storage device in which incoming data received in write commands from an external host are first stored in the cache storage and later moved to the main storage is disclosed. The method includes detecting an available capacity of the cache storage and determining a ratio of cache clearing steps to host write commands based on the detected available capacity of cache storage. Cache clearing steps are interleaved with execution of host write commands to achieve the determined ratio, where execution of cache clearing steps includes maintaining a busy status generated at the storage device that is triggered by a host write command for a period of time beyond a time sufficient to execute the host write command and copying data from the cache storage to the main storage during that period of time.

In yet another aspect, a method of managing movement of data from a cache storage to a main storage in a storage device includes detecting an available capacity of cache storage and then determining a ratio of cache clearing steps to host commands based on the detected available capacity. Cache clearing steps are interleaved with execution of host commands to achieve the determined ratio of cache clearing steps to host commands. The execution of cache clearing steps includes maintaining a busy status generated at the storage device and triggered by a host command for a period of time beyond a time sufficient to execute the host command and copying at least a portion of data from the cache storage to the main storage during that period of time.

In another aspect of the invention, a storage device includes a cache storage configured for receiving data associated with host write commands, a main storage in communication with the cache storage and configured to receive data transferred from the cache storage, and a controller arranged to manage transfer of data from the cache storage to the main storage. The controller is configured to generate a busy status after receiving a host write command and, after writing the data received with the host write command to the cache storage, copy at least a portion of data from the cache storage to the main storage while maintaining the busy status, where sufficient available capacity is present in the cache storage for receiving data in a subsequent write command from the host when copying is initiated.

A storage device is disclosed, in another aspect of the invention, having a cache storage configured for receiving data from a host, a main storage in communication with the cache storage and configured to receive data transferred from the cache storage, and a controller arranged to manage transfer of data from the cache storage to the main storage. The controller is further configured to detect if an available capacity of the cache storage is greater than a minimum capacity for receiving data from the host and less than a desired threshold capacity. The controller is also configured to determine a ratio of cache clearing steps to host commands based on the detected available capacity and then interleave execution of cache clearing steps with execution of host commands to achieve the determined ratio of cache clearing steps to host commands, where execution of cache clearing steps includes maintaining a busy status generated at the storage device and triggered by a host command for a period of time beyond a time sufficient to execute the host command and copying data from the cache storage to the main storage during the period of time.

According to another aspect, a processor readable medium is disclosed that contains processor executable instructions for balancing execution of host commands and cache clearing in a self-caching storage device. The processor executable instructions are configured to cause a processor to perform acts of detecting an available capacity of cache storage, determining a ratio of cache clearing steps to host commands based on the detected available capacity, and interleaving execution of cache clearing steps with execution of host commands to achieve the determined ratio of cache clearing steps to host commands. Execution of cache clearing steps includes maintaining a busy status generated at the storage device and triggered by a host command for a period of time beyond a time sufficient to execute the host command and copying at least a portion of data from the cache storage to a main storage during the period of time.

In another aspect, a circuit is disclosed that contains a controller arranged to manage transfer of data from a cache storage to a main storage in a storage device. The controller is configured to detect an available capacity of the cache storage, determine a ratio of cache clearing steps to host commands based on the detected available capacity of the cache storage, and interleave execution of cache clearing steps with execution of host commands to achieve the determined ratio of cache clearing steps to host commands. The execution of cache clearing steps includes maintaining a busy status generated at the storage device and triggered by a host command for a period of time beyond a time sufficient to execute the host command and copying data from the cache storage to the main storage during that period of time.

According to yet another aspect, a circuit includes a controller arranged to manage transfer of data from a cache storage to a main storage in a storage device. The controller is configured to generate a busy status after receiving a host write command and, after writing the data received with the host write command to the cache storage, to copy at least a portion of data from the cache storage to the main storage while maintaining the busy status, where sufficient available capacity is present in the cache storage for receiving data in a subsequent write command from the host when copying is initiated.

BRIEF DESCRIPTION OF THE PRESENTLY PREFERRED EMBODIMENTS

Figure 1:
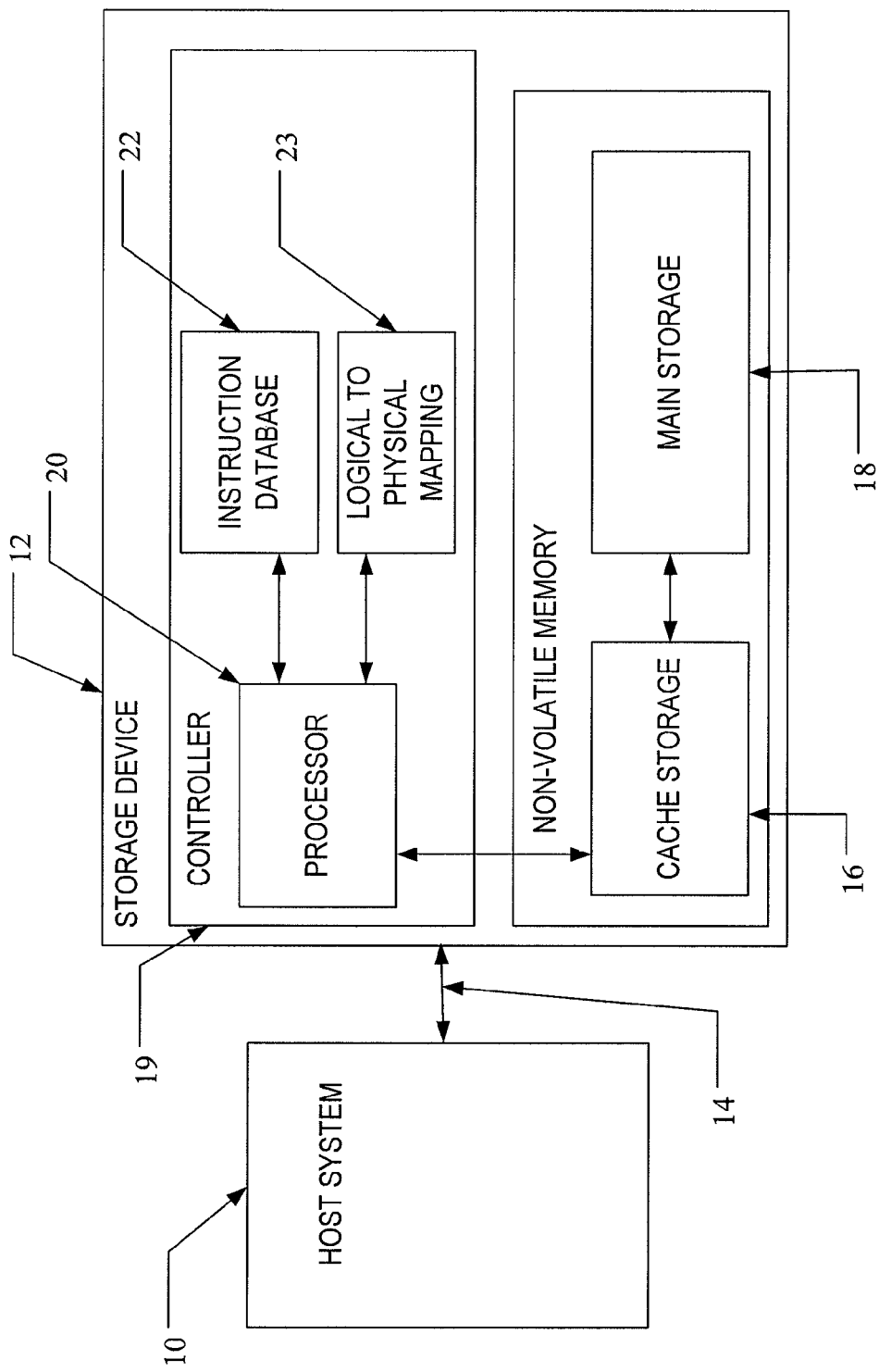
FIG. 1 is a block diagram of a self-caching memory system.

A flash memory system suitable for use in implementing aspects of the invention is shown in FIG. 1. A host system 10 stores data into, and retrieves data from, a self-caching flash storage device 12. The storage device 12 may be embedded in the host or may exist in the form of a card or other removable drive that is removably connected to the host 10 through a mechanical and electrical connector. The host 10 may be any of a number of data generating devices, such as a personal computer. The host 10 communicates with the storage device over a communication channel 14.

The storage device 12 contains non-volatile memory cells that are arranged as cache storage 16 and main storage 18. The cache storage 16 and main storage 18 may be made up of the same type of flash memory cell configured to operate in different modes or different types of flash memory cells. For example, the cache storage 16 may be configured in a single level cell (SLC) type of flash configuration while the main storage 18 may consist of a multi-level cell (MLC) type flash memory configuration to take advantage of the higher write speed of SLC flash and the higher density of MLC flash. Different combinations of flash memory types are also contemplated for the cache storage 16 and main storage 18. The storage device 12 also includes a controller 19 that may include a processor 20, instructions 22 for operating the processor 20 and a logical block to physical block translation table 23. Examples of suitable self-caching flash memory configurations that may be adapted to implement the cache flushing policies described herein are disclosed in U.S. Pat. No. 5,930,167 to Lee et al. and in U.S. application Ser. No. 11/318,906 to Lasser et al., both of which are incorporated herein by reference in their entirety.

Figure 2:
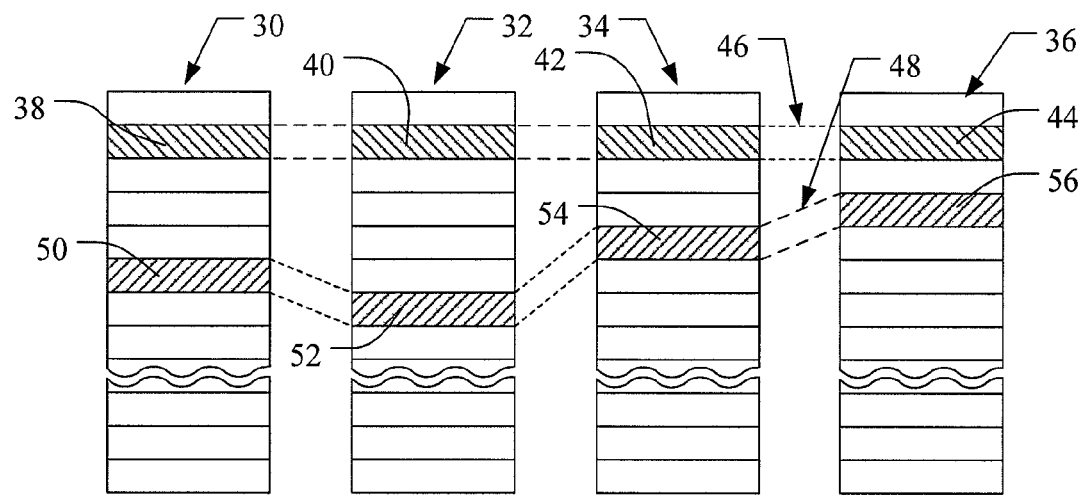
FIG. 2 illustrates an example physical memory organization of the system of FIG. 1.

The cache storage 16 and main storage 18, as mentioned above, may be non-volatile flash memory arranged in blocks of memory cells. A block of memory cells is the unit of erase, i.e., the smallest number of memory cells that are physically erasable together. For increased parallelism, however, the blocks may be operated in larger metablock units. One block from each plane of memory cells may be logically linked together to form a metablock. In a storage device where the cache storage 16 is in an SLC configuration and the main storage 18 is in an MLC configuration, a metablock arrangement is useful because multiple cache blocks may be needed to store an amount of data equal to one main storage block. Referring to FIG. 2, a conceptual illustration of a representative flash memory cell array is shown. Four planes or sub-arrays 30, 32, 34 and 36 memory cells may be on a single integrated memory cell chip, on two chips (two of the planes on each chip) or on four separate chips. The specific arrangement is not important to the discussion below and other numbers of planes may exist in a system. The planes are individually divided into blocks of memory cells shown in FIG. 2 by rectangles, such as blocks 38, 40, 42 and 44, located in respective planes 30, 32, 34 and 36. There may be dozens or hundreds of blocks in each plane. Blocks may be logically linked together to form a metablock that may be erased as a single unit. For example, blocks 38, 40, 42 and 44 may form a first metablock 46. The blocks used to form a metablock need not be restricted to the same relative locations within their respective planes, as is shown in the second metablock 48 made up of blocks 50, 52, 54 and 56.

Figure 3:
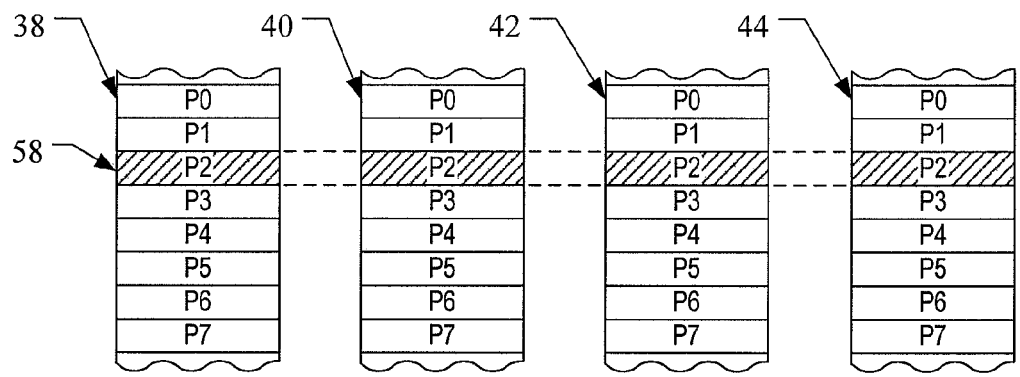
FIG. 3 shows an expanded view of a portion of the physical memory of FIG. 2.

The individual blocks are in turn divided for operational purposes into pages of memory cells, as illustrated in FIG. 3. The memory cells of each of blocks 38, 40, 42, and 44, for example, are each divided into eight pages P0-P7. Alternately, there may be 16, 32 or more pages of memory cells within each block. A page is the unit of data programming (writing) and reading within a block, containing the minimum amount of data that are programmed (written) or read at one time. A metapage 58 is illustrated in FIG. 3 as formed of one physical page for each of the four blocks 38, 40, 42 and 44. The metapage 58 includes the page P2 in each of the four blocks but the pages of a metapage need not necessarily have the same relative position within each of the blocks. A metapage is the maximum unit of programming. The blocks disclosed in FIGS. 2-3 are referred to herein as physical blocks because they relate to groups of physical memory cells as discussed above. As used herein, a logical block is a virtual unit of address space defined to have the same size as a physical block. Each logical block includes a range of logical block addresses (LBAs) that are associated with data received from a host 10. The LBAs are then mapped to one or more physical blocks in the storage device 12 where the data is physically stored. In operation, the cache storage 16 of the storage device 12 will receive data from the host 10 associated with host write commands. The data received at the cache storage 16 is addressed in logical blocks of addresses by the host and, when the data is stored in cache storage 16, the data associated with a given logical block of addresses may be stored in a single physical block in the cache storage 16 or dispersed over multiple different physical blocks in the cache storage 16. The processor 20 tracks the mapping of logical addresses to physical addresses in a logical to physical mapping table 23. The processor 20 will look at the current cache storage capacity to determine if the host write and cache flush balancing mechanism described herein should be initiated based on processor executable instructions in the instructions database 22. When cache storage flushing is warranted based on the current cache capacity and the balancing algorithm, the processor will look at logical blocks of data to determine if the portion of the data residing in one or more physical blocks of the cache storage 16 that corresponds to a particular logical block will be copied to the main storage 18. Examples of flash management systems that may be modified to incorporate the host write and cache flush balancing algorithm disclosed herein may be found in U.S. Pat. Nos. 5,937,425 to Ban and 6,678,785 to Lasser, and the entirety of each of these patents is hereby incorporated by reference.

In order to balance between the resources of the storage device 12 that are provided to support the host and the resources allocated for keeping the cache storage 16 from being too full, the storage device 12 is configured to implement a host write and cache flush balancing algorithm that intentionally provides the host 10 with a lower performance than it is actually capable of providing. The storage device utilizes the "stolen" time for flushing the cache storage even when a flushing operation is not required. Although the examples provided herein focus on balancing host write commands with cache flushing, it is contemplated that other host commands such as host read commands or erase commands may also be interleaved with cache clearing steps to achieve cache storage equilibrium.

Figure 4:
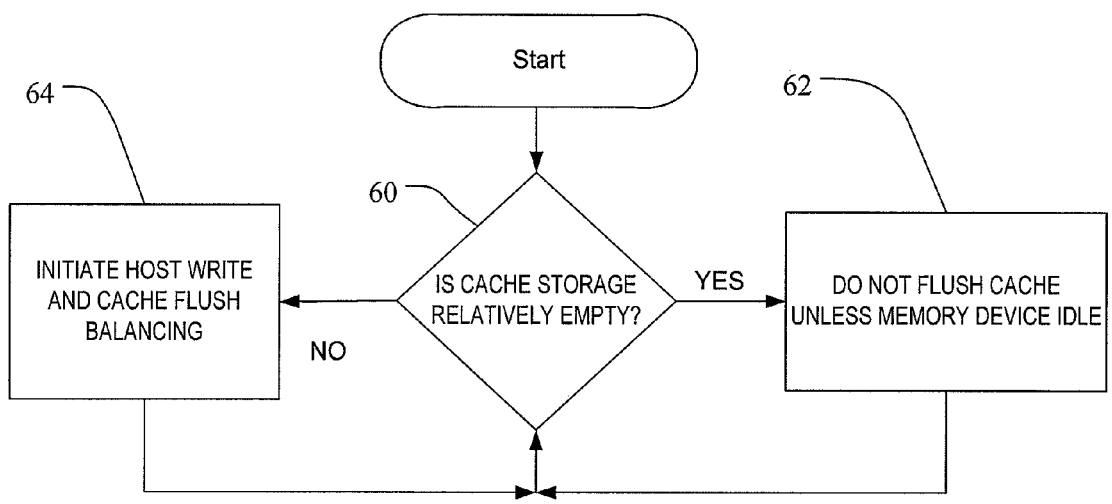
FIG. 4 is a flow diagram illustrating a method of determining whether to implement a write and cache flush balancing mechanism according to a preferred embodiment.

As illustrated in FIG. 4, when the cache storage 16 is relatively empty, the storage device 12 may use a known cache flushing policy so that the host 10 receives maximum support and sees maximum performance (the burst write performance). No data is flushed from cache storage 16, unless the host 10 is not accessing the device and the storage device becomes otherwise idle (at 60, 62). But when the cache storage 16 is relatively full, the storage device 12 activates a balancing mechanism that allocates time between serving the host 10 and serving the cache storage 12 (at 60, 64). As a non-limiting example, the cache may be considered relatively empty when it is less than half full and relatively full when it is equal to or more than half full. Other thresholds may also be used to set a trigger point for activating the balancing mechanism.

Figure 5:
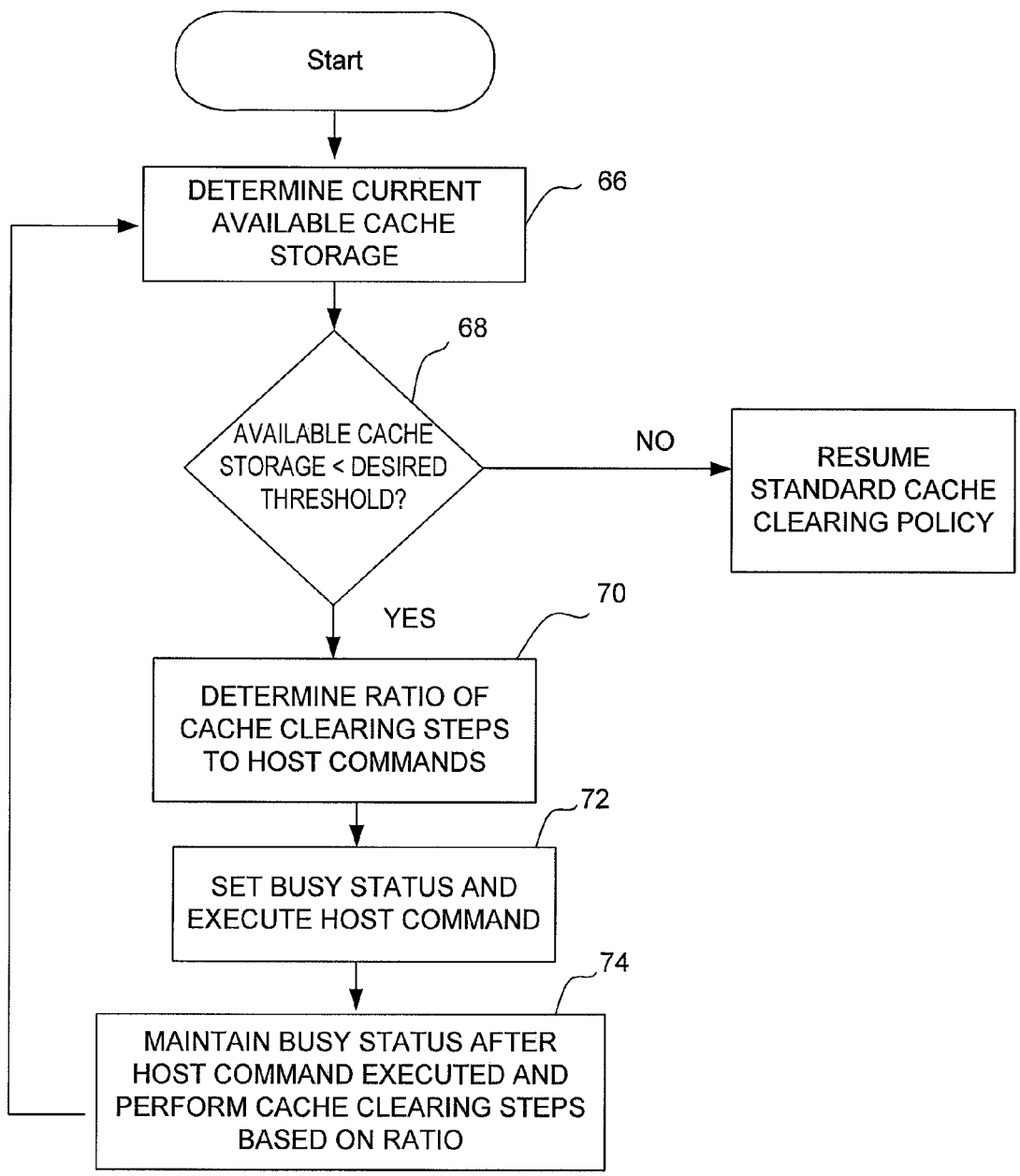
FIG. 5 is a flow diagram illustrates one embodiment of a host write and cache flush balancing mechanism according to a preferred embodiment.

A more detailed example of one implementation of the host write and cache flush balancing mechanism is shown in FIG. 5. If the available capacity in the cache storage is less than desired capacity (i.e. the cache storage 16 is relatively full as described above), the processor 20 will determine a number of cache flushing steps to insert between each two successive host requests (at 68, 70). In limited circumstances, if the cache storage 16 is so full that the available capacity is less than a minimum threshold that will allow the storage device 12 to operate without first performing cache clearing steps, the balancing of cache flushing and host write steps may be delayed (at 66). If, as one non-limiting example, the minimum threshold for a particular storage device was 1% available capacity and the current available capacity in the cache was below this threshold, the storage device may postpone any balancing of host write and cache flushing steps until cache clearing steps could be executed so that available capacity at least reached this minimum threshold.

In one embodiment, the number of cache flushing steps may be determined by the processor 20 looking up a ratio of executing cache clearing steps to host commands stored in a table correlating different ratios to different trigger levels of available capacity in the cache storage 16. The ratio correlating to the detected available capacity in the cache storage 16 may then be used by the processor 20 to schedule a number of cache flushing steps to be interleaved between successive host commands corresponding to the ratio. For instance, a ratio of 2 would result in the processor 20 scheduling two cache flushing steps to follow each host command. To allow for better resolution and fine-tuning of the balance between executing cache flushing and host commands, the ratios may include non-integers. As one example, the ratio for a particular trigger level of available cache storage might be 3.5. The processor 20 would then schedule a repeating pattern of a host command followed by 3 cache flushing steps and a second host command followed by 4 cache flushing steps to achieve an effective ratio of 3.5. If only a small amount of cache flushing is needed, the ratio may be less than one, in which case consecutive host commands may be executed before a cache clearing step is scheduled.

In alternative embodiments, one or more other parameters, in addition to the detected available capacity of the cache storage, may be factored in to determine the ratio of cache flushing steps to host write commands. Storage device load parameters, such as a current amount of allocated heap memory in the storage device 12, may be used. Such additional parameters may be factored into the ratio determination to alter the trigger points where a next ratio is selected. Other storage device load parameters that may be used may be specific to the particular flash management algorithm implemented in the storage device 12. Such other parameters may include the length of certain lists utilized by the flash management algorithm, the amount of used space in certain hash tables, and so on.

Referring again to FIG. 5, after determining and scheduling the number of cache flushing steps to host commands, the processor may implement the schedule by, upon receipt of a host command, setting the busy status for the storage device (at 72). After the host command is executed, the processor will extend the duration of a busy status that is set by the storage device 12 after the host command. The busy status indication is a standard condition that storage devices 12 will set and hosts 10 will recognize that prevents a host 10 from sending more data, and typically also prevents the host from sending most commands, until the busy status is cleared. Storage devices 12 will generally set a busy status after receiving a host command and maintain the busy status for the period of time it takes the storage device 12 to complete the steps necessary to execute the command. When implementing the balancing mechanism, the processor extends the period of time that the storage device maintains the busy status beyond the time needed to execute the particular command and until the scheduled number of cache flushing steps has been executed (at 74). The specific implementation of the busy status for a device will depend on the protocol for that device. For example, if the storage device is a NAND device or emulates a NAND device protocol, the busy status may be a separate signal controlled by the storage device 12 that informs the host 10 that it is busy or ready. In SD protocol devices, the storage device indicates that it is busy by controlling one of the lines used to transfer data. The host 10 will sample that line at predefined points in time to determine if it can send the next batch of data to be written. Other protocols may use other schemes to provide the busy status discussed herein and any of a number of types of busy status indications may be utilized in the system and method disclosed herein.

Each cache flushing step may consist of selecting a logical block of addresses and copying at least one page of the data from the cache storage 16 that is associated with the particular logical block into the main storage 18. Although a cache flushing step may also consist of copying all pages of data associated with the selected logical block (i.e. an entire logical block), a single page or group of pages amounting to less than all the data associated with the selected logical block may be more typical. One example of a system where copying may be done in a sequence of separate page copy operations may be found in pending U.S. application Ser. No. 11/876, 893, filed Oct. 23, 2007, entitled "Interruptible Cache Flushing in Flash Memory Systems", the entirety of which is incorporated herein by reference. The busy status is maintained while the determined number of cache flushing steps is completed and then the busy status is cleared to allow the host to send another command. Selection of which particular logical block will have its corresponding data copied to the main storage may be based on any of a number of criteria. For example, the selection may be based on which logical block has the most data in the physical blocks of the cache storage 16, or which logical block has data in the greatest number of physical blocks in the cache storage 16.

If we assume that the available capacity in the cache storage 16 is above the minimum capacity and less than a desired capacity and that the determined ratio of scheduled cache clearing steps to host write requests is N1, the average performance perceived by the host will be W1 (measured in Megabytes per second). During the time of executing cache clearing steps the storage device 12 maintains a busy state indication. Specifically, it starts the busy status after the host sends a write request, but also maintains it for the time required for the inserted cache clearing steps. The added time of maintaining the busy status forces the host 10 to slow down, reducing the rate of data sent to the storage device 12.

Note, however, that at this stage the reduced rate may still be above the sustained write performance rating.

After initiating the balancing mechanism, the processor 20 of the storage device 12 continues to monitor the state of the cache. It may turn out that the current ratio of cache clearing steps to host commands has stopped the cache storage 16 from filling up any further, but sometimes it may continue to fill up. If this happens, a second trigger point will be reached. For example, if the initial condition of the cache being 50% full triggered the balancing mechanism, the condition of the cache being 60% full may be the second trigger point. If the storage device detects that condition, a more aggressive policy may be adopted. instead of scheduling a ratio of N1 cache clearing steps per each host request, a ratio of N2 steps will be scheduled, where N2>N1. The effective sustained write performance seen by the host will go down to W2, where W2<W1. This more reduced performance mode may be sufficient to balance the system in an equilibrium where the cache stops filling up, or it may still not be enough, in which case additional such triggering points with corresponding further reduced host performance values are activated. Eventually, an equilibrium is reached in which the host is serviced at some average rate while the cache is not getting fuller any more.

Although it is possible to use a single trigger point to attempt a crude form of host write and cache flush balancing, it is preferable to use multiple trigger points because the real-life performance of the storage device is dependent upon the access pattern of the host 10. Typically, the advertised sustained write performance of a storage device is correct for a host writing data into sequential addresses. When the host 10 writes data into random addresses, the sustained write performance is generally lower. The more random the access pattern, the lower the effective performance. This effect is due to the relative inefficiency of flash management algorithms when dealing with random address patterns. Because of this, the proper balancing ratios for getting the cache into equilibrium can be unpredictable, and a sequence of trigger conditions is generally needed for successively reducing host service performance until equilibrium is reached. It should also be noted that under random address patterns the equilibrium point might result in an average sustained write performance (as seen by the host) that is even lower than the advertised sustained write performance.

Referring once again to FIG. 5, when the host starts to slow down in generating new data, an opposite process takes place. As the cache storage 16 empties, the same trigger levels that resulted in the processor 20 applying increasing ratios of cache clearing steps to host commands as the available capacity of the cache was getting smaller may be applied in the reverse order as the cache empties and the available capacity increases so that fewer resources are committed to the cache clearing process. In an alternative embodiment, the triggers for applying progressively increasing ratios when the cache is filling up may be different than the triggers for applying the same, or different, ratios as the cache empties out. For example, the trigger for changing from the first ratio to a second ratio when the cache is filling up may be when the cache is 60% full, but the trigger point for switching back to the first ratio from the second ratio when the cache is emptying out may be set for when the cache storage is 55% full. In this manner, a hysteresis-like effect is provided for the triggering conditions and high frequency toggling between two scheduling modes can be avoided. Eventually, the cache storage 16 will reach a relatively empty state, for example less than 50% full, and the storage device 12 will fall back into the initial mode of providing full priority (burst write performance) to host requests.

A method and system has been disclosed for implementing a host write operation and cache flush balancing mechanism that sacrifices an amount of data write performance to maintain the cache equilibrium and avoid instances of prolonged time out periods. The method balances execution of host commands by determining an available capacity in a cache storage portion of a self-caching storage device, determining a ratio of cache flushing steps to host write commands if the available capacity is below a desired threshold and interleaving cache flushing steps with host commands to achieve the ratio. The cache flushing steps may be executed by maintaining a storage device busy status after executing a host write command and utilizing this additional time to copy a portion of the data from the cache storage into the main storage. Although performance provided to the host is reduced by this method, it may still be quite high, possibly even higher than the advertised sustained rate.

We claim:

1. A method of managing movement of data from a cache storage to a main storage in a storage device in which incoming data received in write commands from an external host are first stored in the cache storage and later moved to the main storage, the method comprising:
    receiving a write command from the host at the storage device;
    storing data received with the write command in the cache storage;
    generating a busy status at the storage device after receiving the write command; and
    subsequent to storing the data in the cache storage, copying at least a portion of data from the cache storage to the main storage while maintaining the busy status, wherein sufficient available capacity is present in the cache for receiving data in a subsequent write command from the host when the copying is initiated.

2. The method of claim 1, wherein copying at least a portion of data from the cache storage comprises copying at least a portion of data from the cache storage if an available capacity of the cache storage is below a desired threshold.

3. The method of claim 2, wherein the desired threshold is 50% available capacity in the cache storage.

4. The method of claim 1, wherein copying at least a portion of the data from the cache storage comprises executing a selectable number of cache clearing steps, and wherein each cache clearing step copies data from at least one page in the cache storage to the main storage.

5. The method of claim 4, further comprising determining the selectable number based at least in part on an available capacity in the cache storage.

6. A method of managing movement of data from a cache storage to a main storage in a storage device in which incoming data received in write commands from an external host are first stored in the cache storage and later moved to the main storage, the method comprising:
    detecting an available capacity of the cache storage;
    determining a ratio of cache clearing steps to host write commands based on the detected available capacity of cache storage; and
    interleaving execution of cache clearing steps with execution of host write commands to achieve the determined ratio of cache clearing steps to host write commands, wherein execution of cache clearing steps comprises maintaining a busy status generated at the storage device that is triggered by a host write command for a period of time beyond a time sufficient to execute the host write command and copying data from the cache storage to the main storage during the period of time.

7. The method of claim 6, wherein determining the ratio of cache clearing steps to host write commands is based on at least one additional parameter in addition to the detected available capacity.

8. The method of claim 7, wherein the at least one additional parameter comprises a storage device load parameter.

9. The method of claim 8, wherein the storage device load parameter comprises a current amount of allocated heap memory.

10. The method of claim 6, wherein the ratio comprises a non-integer ratio.

11. The method of claim 6, further comprising only determining the ratio of cache clearing steps to host write commands and interleaving execution of cache clearing steps with execution of host write commands if the detected available capacity is less than a desired threshold capacity.

12. The method of claim 6, further comprising only determining the ratio of cache clearing steps to host write commands and interleaving execution of cache clearing steps with execution of host write commands if the detected available capacity is greater than a minimum capacity for receiving data from a host and less than a desired threshold capacity.

13. A method of managing movement of data from a cache storage to a main storage in a storage device in which incoming data from an external host are first stored in the cache storage and later moved to the main storage, the method comprising:
   detecting an available capacity of cache storage; and
   determining a ratio of cache clearing steps to host commands based on the detected available capacity; and
   interleaving execution of cache clearing steps with execution of host commands to achieve the determined ratio of cache clearing steps to host commands, wherein execution of cache clearing steps comprises maintaining a busy status generated at the storage device and triggered by a host command for a period of time beyond a time sufficient to execute the host command and copying at least a portion of data from the cache storage to the main storage during the period of time.

14. The method of claim 13, wherein the ratio comprises a non-integer ratio.

15. The method of claim 13, wherein the host commands comprise host read commands.

16. The method of claim 13, wherein the host commands comprise host erase commands.

17. The method of claim 13, wherein determining the ratio of cache clearing steps to host commands is based on at least one additional parameter in addition to the detected available capacity.

18. The method of claim 17, wherein the at least one additional parameter comprises a storage device load parameter.

19. The method of claim 18, wherein the storage device load parameter comprises a current amount of allocated heap memory.

20. The method of claim 13, further comprising only determining the ratio of cache clearing steps to host commands and interleaving execution of cache clearing steps with execution of host commands if the detected available capacity is less than a desired threshold capacity.

21. The method of claim 13, further comprising only determining the ratio of cache clearing steps to host commands and interleaving execution of cache clearing steps with execution of host commands if the detected available capacity is greater than a minimum capacity for receiving data from a host and less than a desired threshold capacity.

22. A storage device comprising:
   a cache storage configured for receiving data associated with host write commands;
   a main storage in communication with the cache storage and configured to receive data transferred from the cache storage; and
   a controller arranged to manage transfer of data from the cache storage to the main storage, wherein the controller is configured to:
      generate a busy status after receiving a host write command and, after writing the data received with the host write command to the cache storage, copy at least a portion of data from the cache storage to the main storage while maintaining the busy status, wherein sufficient available capacity is present in the cache storage for receiving data in a subsequent write command from the host when copying is initiated.

23. The storage device of claim 22, wherein the controller is configured to maintain the busy status after writing the data received with the host write command if an available capacity of the cache storage is below a desired threshold.

24. The storage device of claim 23, wherein the desired threshold is 50% available capacity in the cache storage.

25. The storage device of claim 22, wherein the cache storage comprises a single level cell non-volatile memory and the main storage comprises a multi-level cell non-volatile memory.

26. A storage device comprising:
   a cache storage configured for receiving data from a host;
   a main storage in communication with the cache storage and configured to receive data transferred from the cache storage; and
   a controller arranged to manage transfer of data from the cache storage to the main storage, wherein the controller is configured to:
      detect an available capacity of the cache storage;
      determine a ratio of cache clearing steps to host commands based on the detected available capacity of the cache storage; and
      interleave execution of cache clearing steps with execution of host commands to achieve the determined ratio of cache clearing steps to host commands, wherein execution of cache clearing steps comprises maintaining a busy status generated at the storage device and triggered by a host command for a period of time beyond a time sufficient to execute the host command and copying data from the cache storage to the main storage during the period of time.

27. The storage device of claim 26, wherein the controller is configured to determine the ratio of cache clearing steps to host commands based on at least one additional parameter in addition to the detected available capacity.

28. The storage device of claim 27, wherein the at least one additional parameter comprises a storage device load parameter.

29. The storage device of claim 28, wherein the storage device load parameter comprises a current amount of allocated heap memory.

30. The storage device of claim 26, wherein the host commands comprise host write commands and wherein the time sufficient to execute one of the host write commands comprises a time period to write data associated with the host write command to the cache memory.

31. The storage device of claim 26, wherein the controller is configured to execute a selectable number of cache clearing steps, and wherein each cache clearing step comprises copying data from at least one page in the cache storage to the main storage.

32. The storage device of claim 31, wherein the controller is further configured to determine the selectable number based at least in part on an available capacity in the cache storage.

33. The storage device of claim 26, wherein the controller is further configured to only determine the ratio of cache clearing steps to host commands and interleave execution of cache clearing steps with execution of host commands if the detected available capacity is less than a desired threshold capacity.

34. The storage device of claim 26, wherein the controller is further configured to only determine the ratio of cache clearing steps to host commands and interleave execution of cache clearing steps with execution of host commands if the detected available capacity is greater than a minimum capacity for receiving data from the host and less than a desired threshold capacity.

35. A processor readable medium comprising processor executable instructions for balancing execution of host commands and cache clearing in a self-caching storage device, the processor executable instructions configured to cause a processor to perform acts of:
   detecting an available capacity of cache storage; and
   determining a ratio of cache clearing steps to host commands based on the detected available capacity; and
   interleaving execution of cache clearing steps with execution of host commands to achieve the determined ratio of cache clearing steps to host commands, wherein execution of cache clearing steps comprises maintaining a busy status generated at the storage device and triggered by a host command for a period of time beyond a time sufficient to execute the host command and copying at least a portion of data from the cache storage to a main storage during the period of time.

36. The processor readable medium of claim 35, wherein the ratio comprises a non-integer ratio.

37. The processor readable medium of claim 35, wherein the host commands comprise host read commands.

38. The processor readable medium of claim 35, wherein the host commands comprise host erase commands.

39. The processor readable medium of claim 35, wherein the host commands comprise host write commands.

40. A circuit comprising:
   a controller arranged to manage transfer of data from a cache storage to a main storage in a storage device, wherein the controller is configured to:
      generate a busy status after receiving a host write command; and,
      after writing the data received with the host write command to the cache storage, copy at least a portion of data from the cache storage to the main storage while maintaining the busy status, wherein sufficient available capacity is present in the cache storage for receiving data in a subsequent write command from the host when copying is initiated.

41. A circuit comprising:
   a controller arranged to manage transfer of data from a cache storage to a main storage in a storage device, wherein the controller is configured to:
      detect an available capacity of the cache storage;
      determine a ratio of cache clearing steps to host commands based on the detected available capacity of the cache storage; and
      interleave execution of cache clearing steps with execution of host commands to achieve the determined ratio of cache clearing steps to host commands, wherein execution of cache clearing steps comprises maintaining a busy status generated at the storage device and triggered by a host command for a period of time beyond a time sufficient to execute the host command and copying data from the cache storage to the main storage during the period of time.

* * * * *